United States Patent
Suzuki et al.

(10) Patent No.: US 7,404,423 B2
(45) Date of Patent: Jul. 29, 2008

(54) PNEUMATIC TIRE WITH TREAD INCLUDING BLOCKS HAVING APPROXIMATELY EQUAL ASPECT RATIOS

(75) Inventors: Takayuki Suzuki, Kanagawa (JP); Toshiro Oyama, Kanagawa (JP)

(73) Assignee: The Yokohama Rubber Co., Ltd., Tokyo (JP)

(*) Notice: Subject to any disclaimer, the term of this patent is extended or adjusted under 35 U.S.C. 154(b) by 279 days.

(21) Appl. No.: 11/251,840

(22) Filed: Oct. 18, 2005

(65) Prior Publication Data
US 2006/0081317 A1 Apr. 20, 2006

(30) Foreign Application Priority Data
Oct. 18, 2004 (JP) ............................. 2004-303237

(51) Int. Cl.
*B60C 11/11* (2006.01)
(52) U.S. Cl. .............................. 152/209.1; 152/209.18; 152/902
(58) Field of Classification Search ............. 152/209.1, 152/209.18, 902
See application file for complete search history.

(56) References Cited

U.S. PATENT DOCUMENTS

| D175,214 | S | * | 7/1955 | French | 152/902 |
| 6,000,451 | A | * | 12/1999 | Takada | 152/902 |
| 6,450,221 | B1 | * | 9/2002 | Bonko | 152/902 |

FOREIGN PATENT DOCUMENTS

| EP | 1034945 | * | 9/2000 |
| JP | 2002-002231 | | 1/2002 |

* cited by examiner

*Primary Examiner*—Steven D Maki
(74) *Attorney, Agent, or Firm*—Greer, Burns & Crain, Ltd

(57) ABSTRACT

In a pneumatic tire, a block unit includes a center block and side blocks separated by a communication groove. Aspect ratios of the center block and the side blocks are approximately the same. The center block and the side blocks are arranged such that a longitudinal direction of a rectangle relating to the aspect ratio of the center block and longitudinal directions of rectangles relating to the aspect ratios of the side blocks are approximately orthogonal to each other. Size ratios of a short side of the rectangle relating to the aspect ratio of the center block and the long sides of the rectangles relating to the aspect ratios of the side blocks are in a range equal to or more than 0.90 to equal to or less than 1.10.

6 Claims, 2 Drawing Sheets

FIG.2

| SNOW TRACTION PERFORMANCE | CONVENTIONAL EXAMPLE | COMPARATIVE EXAMPLE 1 | COMPARATIVE EXAMPLE 2 | COMPARATIVE EXAMPLE 3 | COMPARATIVE EXAMPLE 4 |
|---|---|---|---|---|---|
| ASPECT RATIO OF CENTER BLOCK | 0.77 | 0.80 | 0.80 | 0.80 | 0.80 |
| ASPECT RATIO OF SIDE BLOCK | 0.65 | 0.80 | 0.70 | 0.80 | 0.80 |
| ORIENTATION OF CENTER BLOCK AND SIDE BLOCK | SAME DIRECTION | SAME DIRECTION | ALTERNATE DIRECTIONS | ALTERNATE DIRECTIONS | ALTERNATE DIRECTIONS |
| bc/a1 | 1.16 | 1.00 | 1.00 | 0.80 | 1.20 |
| CENTER-WEAR RESISTANCE PERFORMANCE | 100 | 90 | 100 | 100 | 100 |
| SNOW TRACTION PERFORMANCE | 100 | 100 | 90 | 95 | 90 |

| SNOW TRACTION PERFORMANCE | FIRST EMBODIMENT | SECOND EMBODIMENT | THIRD EMBODIMENT | FOURTH EMBODIMENT | FIFTH EMBODIMENT | SIXTH EMBODIMENT |
|---|---|---|---|---|---|---|
| ASPECT RATIO OF CENTER BLOCK | 0.80 | 0.80 | 0.7 | 0.75 | 0.85 | 0.90 |
| ASPECT RATIO OF SIDE BLOCK | 0.80 | 0.80 | 0.7 | 0.75 | 0.85 | 0.90 |
| ORIENTATION OF CENTER BLOCK AND SIDE BLOCK | ALTERNATE DIRECTIONS | ALTERNATE DIRECTIONS | ALTERNATE DIRECTIONS | ALTERNATE DIRECTIONS | ALTERNATE DIRECTIONS | ALTERNATE DIRECTIONS |
| bc/a1 | 0.90 | 1.10 | 0.95 | 0.95 | 0.95 | 0.95 |
| CENTER-WEAR RESISTANCE PERFORMANCE | 110 | 110 | 105 | 110 | 115 | 110 |
| SNOW TRACTION PERFORMANCE | 110 | 110 | 110 | 110 | 110 | 105 |

PNEUMATIC TIRE WITH TREAD INCLUDING BLOCKS HAVING APPROXIMATELY EQUAL ASPECT RATIOS

BACKGROUND OF THE INVENTION

1. Field of the Invention

The present invention relates to a pneumatic tire, and particularly relates to a pneumatic tire having better traction performance and that is resistant to wear.

2. Description of the Related Art

A conventional pneumatic tire has been disclosed in Japanese Patent Application Laid-open No. 2002-2231. This pneumatic tire has lugs sectioned by lug grooves opened at an end of a tread portion and circumferential grooves of the tire, and has center blocks defined by the circumferential grooves and the lateral grooves. The total length of the lug in a widthwise direction of the tread portion is equal to or more than a corresponding length of the center block and is equal to ¼ or more of the tread width.

However, the conventional pneumatic tire undergoes irregular wear, particularly on unpaved roads. In other words, the conventional pneumatic tire wears more in the central part than at the shoulders. This phenomenon will be called below as center wear.

There is need of a pneumatic tire that is has better center-wear resistance performance.

SUMMARY OF THE INVENTION

It is an object of the present invention to provide a pneumatic tire having better traction performance and that is resistant to center-wear.

According to one aspect of the present invention, a pneumatic tire having a plurality of blocks sectioned by grooves on a tread portion includes a plurality of communication grooves, each communication groove extending from one shoulder to other shoulder; and a plurality of block units, each block unit including a single center block and a pair of side blocks arranged so as to sandwich the center block from both sides thereof and these blocks being arranged along the communication groove. When the center block and the side blocks are respectively surrounded by rectangles defined by straight lines parallel to a straight line connecting the gravity centers of the pair of side blocks and straight lines perpendicular to the straight line and a ratio of a long side and a short side of each rectangle is defined as an aspect ratio in a plan view of the tread portion. Aspect ratios of the center block and the side block are approximately equal to each other. The center block and the side blocks are arranged such that a longitudinal direction of the rectangle relating to the aspect ratio of the center block and a longitudinal direction of the rectangle relating to the aspect ratio of the side block are approximately orthogonal to each other. A size ratio of a short side of the rectangle relating to the aspect ratio of the center block and a long side of the rectangle relating to the aspect ratio of the side block is in a range equal to or more than 0.9 to equal to or less than 1.10.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a table of results of performance tests performed on the pneumatic tire shown in FIG. 1.

DETAILED DESCRIPTION OF THE PREFERRED EMBODIMENTS

Figure 1:
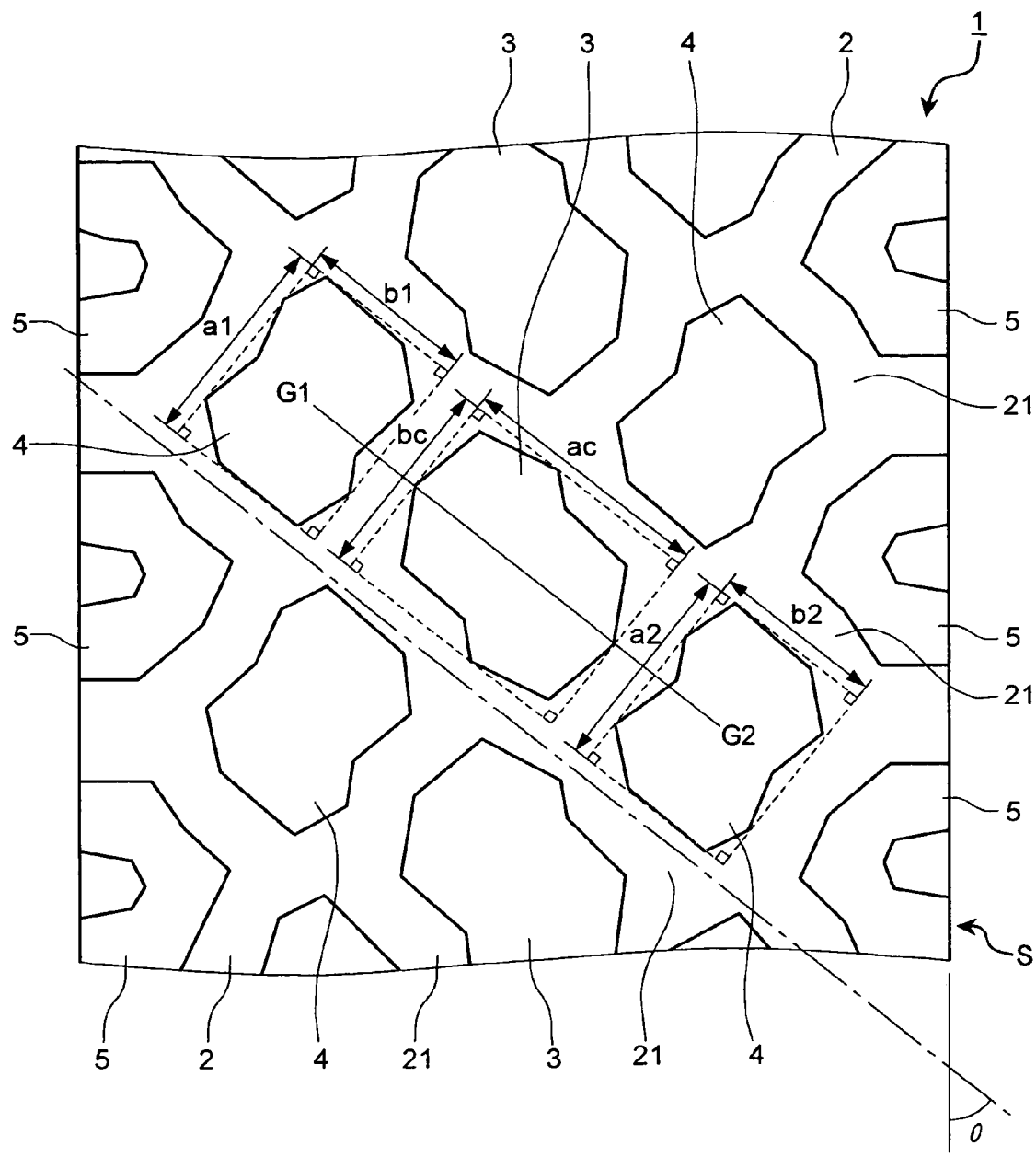
FIG. 1 is a plan view of a tread portion of a pneumatic tire according to an embodiment of the present invention.

Exemplary embodiments of the present invention will be explained below in detail with reference to the accompanying drawings. Note that the invention is not limited by the embodiments. Constituent elements described below will include other elements that are easily replaceable by those skilled in the art, or elements that are substantially the same to the described ones.

A pneumatic tire 1 according to a first embodiment of the present invention is, for example, a pneumatic tire for heavy duty used under both running conditions on snowy roads and unpaved roads. The pneumatic tire 1 has grooves 2 and a tread (or tread face) including blocks 3 to 5.

The grooves 2 are formed in the form of a web on the tread portion and the grooves 2 include communication grooves 21. The communication groove 21 constitutes a fiber portion extending in a direction of a web woven when the grooves 2 are viewed as the web woven lengthwise and crosswise. The communication grooves 21 are substantially straight, extend from shoulder to shoulder of the pneumatic tire 1, and make an angle θ with a circumference of the pneumatic tire 1. The communication groove 21 achieves linear communication between both the shoulders and it is formed such that, when a person views the tread portion (a group of blocks 3 to 5) from one side face thereof, he/she can see through the other side. A plurality of communication grooves 21 is formed on the tread portion. The communication grooves 21 are arranged in the tire circumferential direction at predetermined intervals (for each blocks 3 to 5). Mud draining performance on the tread portion is improved due to the presence of the communication grooves 21.

The blocks 3 to 5 include a center block 3, a side block 4, and a shoulder block 5. A group of blocks 3 to 5 arranged along the communication groove 21 is called here a block unit S for explanation purpose. The block unit S includes a single center block 3, a pair of side blocks 4, and a pair of shoulder blocks 5. The group of the blocks 3 to 5 (the block unit S) are linearly arranged so as to go across the tread portion along the communication groove 21 while being inclined at the angle θ to the circumference of the pneumatic tire 1.

Specifically, the block unit S has following structure. A center block 3 is first arranged on a center portion of the tread portion. The side blocks 4 are then arranged around the center block 3. The shoulder blocks 5 are then arranged around both the center block 3 and the side blocks 4. The shoulder blocks 5 are positioned at the shoulders of the pneumatic tire 1. The blocks 3 to 5 are arranged along the communication groove 21.

In the block unit S, aspect ratios bc/ac, b1/a1/, and b2/a2 of the center block 3 and the respective side blocks 4 are less than 1. The aspect ratios of the center block 3 and the respective side blocks 4 are approximately equal to one another. Specifically, differences in aspect ratio between the block 3, and the blocks 4 are in a range equal to or less than 0.05 (5%).

The aspect ratio is defined in the following manner. Gravity centers G1, G2 of the side blocks 4 are first connected by a straight line in plan view. The center block 3 and the pair of side blocks 4 are then respectively surrounded by rectangles defined by straight lines parallel to the above straight line and straight lines perpendicular thereto. A ratio of a long side and a short side of each rectangle is defined as the aspect ratio.

In the block unit S, in a plan view of the tread portion, the center block 3 and the side blocks 4 are arranged such that they are oriented in an alternate manner. That is, the center block 3 and the respective side blocks 4 are arranged such that their long sides of the rectangles relating to their aspect ratios are approximately orthogonal to each other. Specifically, when the straight line connecting the gravity centers G1, G2 is set as a reference line, a longitudinal direction of the rectangle relating to the aspect ratio of the center block 3 becomes approximately parallel to the straight line, and longitudinal directions of the rectangles relating to the aspect ratios of the respective side blocks 4 becomes approximately perpendicular to the straight line. With such an arrangement, the short side of the rectangle relating to the aspect ratio of the center block 3 is mutually opposed to the long sides of the rectangles relating to the aspect ratios of the respective side blocks 4.

In the block unit S, a ratios of sizes of the center block 3 and the respective side blocks 4 are defined such that a vertical size of the center block 3 and lateral sizes of the respective side blocks 4 are approximately equal to each other. That is, the short side of the rectangle relating to the aspect ratio of the center block 3 and the long sides of the rectangles relating to the aspect ratio of the respective side blocks 4 are approximately equal to each other (bc=a1=a2).

In the pneumatic tire 1, the center block 3 and the side blocks 4 has such a structure that (1) their aspect ratios are approximately equal to one another, (2) the longitudinal directions of the rectangles relating to the respective aspect ratios are approximately orthogonal to each other, and (3) size ratios of the short side of the rectangle relating to the aspect ratio of the center block 3 and the long sides of the rectangles relating to the aspect ratios of the side blocks 4 are in a range equal to or more than 0.90 to equal to or less than 1.10.

Accordingly, both traction performance on snowy roads and wear resistance performance on unpaved roads can be achieved (see the first and second embodiments in FIG. 2).

It has been explained above that the block unit S includes a single center block 3, four side blocks 4, and four shoulder blocks 5. However, in addition, other block(s) can be included. For example, a block can be interposed between the side block 4 and the shoulder block 5. On the contrary, the block unit S can be constituted of only a single center block 3 and a pair of side blocks 4 in the manner shown in Japanese Patent Application Laid-open No. 2002-2231. With such a constitution, the side blocks 4 also serve as the shoulder blocks 5.

The aspect ratios of the center block 3 and the respective side blocks 4 are preferably in a range equal to or more than 0.70 to equal to or less than 0.90, more preferably in a range equal to or more than 0.75 to equal to or less than 0.85. Accordingly, both traction performance on snowy roads and wear resistance performance on unpaved roads can be achieved in a high level (see third to sixth embodiments in FIG. 2).

It is preferable that the angle θ is between 20 degrees and 70 degrees. More preferably the angle θ is between 30 degrees and 60 degrees. Accordingly, both traction performance on snowy roads and wear resistance performance on unpaved roads can be improved.

In the pneumatic tire 1, in a plan view of the tread portion, the center block 3 and the side block 4 have approximately similar shapes to each other (see FIG. 1 and FIG. 2). Accordingly, both traction performance on snowy roads and wear resistance performance on unpaved roads can be achieved in a high level. With such a constitution, since calculation of area ratio of the center block 3 and the side block 4 or the like can be conducted easily, and formations of the center block and the side block are performed easily. Also, with such a constitution, the center block 3 and the side block 4 become approximately even in degree of catching snow or mud during running. Accordingly, both traction performance on snowy roads and wear resistance performance on unpaved roads can be improved.

An area ratio of a wheel tread among the respective blocks 3 to 5 are defined such that a grounding area of the side block 4 is smaller than a grounding area of the center block 3, and a grounding area of the shoulder block 5 is smaller than the grounding area of the side block 4. Accordingly, since wears of the respective blocks 3 to 5 are made uniform, center-wear resistance of the tread portion can be improved. In addition, chipping on the center block 3 can be suppressed. Specifically, the grounding area of the shoulder block 5 to the grounding area of the center block 3 is preferably in a range of about 47% to about 56% (in a range equal to or more than $\frac{1}{2.1}$ to equal to or less than $\frac{1}{1.8}$), more preferably in a range of about 49% to about 54%. Accordingly, the center-wear resistance of the tread portion is further improved.

A ratio of the grounding area of the side block 4 to the grounding area of the center block 3 is preferably in a range of about 78% to about 87%, more preferably in a range of about 80% to about 85%. Accordingly, the center-wear resistance of the tread portion is further improved. The grounding area ratios among the respective blocks 3 to 5 can be selected within a range obvious for those skilled in the art based upon a state that a regular load and a regular air pressure according to Japan Automobile Tire Manufacturers Association (JATMA) standard have been applied on the pneumatic tire 1.

Various embodiments of the pneumatic tire were subjected to the following tests (see FIG. 2). In the performance tests, a pneumatic tire with a size of 11R22.5 was assembled to a regular rim according to JATMA standard and a regular load and a regular air pressure are applied to the pneumatic tire. (1) A test car runs on a predetermined road constituted of a paved road of 80% and unpaved roads of 20%, and a running distance when a wear amount of either of the blocks 3 to 5 reached 5 millimeters was measured, so that an index evaluation of center-wear resistance on the unpaved road was performed. (2) A predetermined tests about a climbing performance on a compacted snow slope surface and a braking distance from a velocity of 40 km/h on a compacted snow road surface were performed, so that an index evaluation about traction performance on snowy roads was performed.

In these performance tests, a conventional example is the pneumatic tire described in Japanese Patent Application Laid-open No. 2002-2231.

First, in the pneumatic tires according to first to sixth embodiments, the center block 2 and the side blocks 4 were arranged in an alternate manner (longitudinal directions of rectangles relating to the aspect ratios were orthogonal to each other). On the other hand, in pneumatic tires of the conventional example and comparative examples, their center blocks and side blocks were arranged in the same direction. It can be seen that the pneumatic tires of the according to first to sixth embodiments are superior to the conventional example and the comparative example 1 in both center-wear resistance performance and snow traction performance under such a condition.

In the pneumatic tires according to first to sixth embodiments, the aspect ratio of the center block 3 and the side blocks 4 were equal to each other. On the other hand, in the pneumatic tires of the conventional example and the comparative example 2, the center block 3 and the side blocks 4 were different from each other. It can be thus seen that the pneumatic tires according to first to sixth embodiments are superior to the conventional example and the comparative examples in both center-wear resistance performance and snow traction performance under such a condition.

In the pneumatic tires according to first to sixth embodiments, the size ratio (bc/a1) of the short side of the rectangles relating to the aspect ratio of the center block 3 and the long side of the rectangles relating to the aspect ratio of the side block 4 was in a range equal to or more than 0.90 to equal to or less than 1.10. On the other hand, in the pneumatic tires of the conventional example and the comparative examples 3 and 4, a size ratio (bc/a1) corresponding to that of the above pneumatic tire 1 was not in the range equal to or more than 0.90 to equal to or less than 1.10. It is thus clear that the pneumatic tires according to first to sixth embodiments are superior to the conventional example and the comparative examples in both center-wear resistance performance and snow traction performance under such a condition, as shown in the test results.

In the pneumatic tires according to third to sixth embodiments, aspect ratios of the center blocks 3 and those of the side blocks 4 were equal to each other and values of these aspect ratios were different among the pneumatic tires according to third to sixth embodiments. It is preferable that the aspect ratios of the center block 3 and the side block 4 are in a range equal to or more than 0.75 to equal to or less than 0.85. Accordingly, the center-wear resistance performance can be improved.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A pneumatic tire having a plurality of blocks sectioned by grooves on a tread portion, comprising:
a plurality of communication grooves, each communication groove extending linearly from one shoulder to another shoulder; and
a plurality of block units, each block unit including a single center block and a pair of side blocks arranged so as to sandwich the center block from both sides thereof and these blocks being arranged along the communication groove, wherein
aspect ratios of each center block and each side block in a plan view of the tread portion are approximately equal to each other, each aspect ratio being a ratio of a length of a shorter side to a length of a longer side of a rectangle surrounding each center block or side block, each rectangle being defined by parallel and perpendicular straight sides, the parallel straight sides being parallel to a straight line connecting the gravity centers of the pair of side blocks, the perpendicular straight sides being perpendicular to the straight line,
the center block and the side blocks are arranged such that a longitudinal direction of the rectangle surrounding the center block and a longitudinal direction of the rectangle surrounding the side block are approximately orthogonal to each other, and
a size ratio of a shorter side of the rectangle surrounding the center block to a longer side of the rectangle surrounding the side block is in a range of 0.9 to 1.10.

2. The pneumatic tire according to claim 1, wherein the aspect ratios of the center block and the side block in a plan view of the tread portion are in a range of 0.75 to 0.85.

3. The pneumatic tire according to claim 1, wherein an angle θ of the communication groove to a circumferential direction of the pneumatic tire is in a range of 70 degrees.

4. The pneumatic tire according to claim 1, wherein the center block and the side block have similar shapes in a plan view of the tread portion.

5. The pneumatic tire according to claim 1, wherein a grounding area of the side block is smaller than a grounding area of the center block.

6. The pneumatic tire according to claim 1, further comprising shoulder blocks arranged on both edges of the tread portion, wherein a grounding area of the center block is in a range of 1.8 times to 2.1 times of a grounding area of the shoulder block.

* * * * *